Nov. 1, 1960  H. A. LOVEGREEN  2,958,494
PALLET
Filed Oct. 5, 1959
2 Sheets-Sheet 1

INVENTOR.
HAROLD A. LOVEGREEN
BY
George C. Limbach
ATTORNEY

United States Patent Office 2,958,494
Patented Nov. 1, 1960

2,958,494
PALLET

Harold A. Lovegreen, Walnut Creek, Calif., assignor to Materials Inc., Oakland, Calif., a corporation of California Filed Oct. 5, 1959, Ser. No. 844,557
20 Claims. (Cl. 248—120)

The present invention relates in general to pallets adapted for use with fork lifts and more particularly to an expendable pallet which is capable of supporting loads of many tons and which when dis-assembled can be transported flat.

Load supporting shipping pallets have found considerable use in storage and transportation of goods. The savings in labor handling is considerable where goods can be palletized and shipped with the pallet to their destination.

Heretofore, load supporting pallets have usually been made of wooden parts and constructed with passages between the top and bottom surfaces for receiving the lift forks of manual or power operated stevedore trucks and similar material handling equipment. Some attempt has also been made to construct pallets of this character of metal parts. In either event the cost of materials heretofore used has been relatively high, and although it would be desirable to expend the pallet after shipping of the load, the high cost of manufacturing even simple wooden pallets has ruled out this possibility. The return of empty pallets entails a tremendous job, and furthermore, pallets of heavy materials as wood and metal add to the shipping cost when shipping charges are made by weight.

Numerous unsatisfactory expendable pallets have been placed on the market. Many of these expendable pallets are not strong enough to support loads of the order of many tons. Others are bulky and cannot be knocked-down and shipped flat to the material supplier who will be using them. Other pallets do not provide a substantially flat surface on which the load is placed, and few, if any, expendable pallets allow the load to be lifted from all four sides.

The object of the present invention is to provide an inexpensive expendable pallet which can be easily assembled, is capable of supporting loads of many tons and which, when knocked-down, can be transported flat.

One feature of the present invention is the provision of a knock-down pallet adapted for use in lift truck operations comprising a sheet of corrugated paper or the like having a multiplicity of spaced parallel scores extending between a pair of opposed edges and defining the side margins of a plurality of panels, said sheet folded on the scores to position certain panels in substantially one horizontal plane, other panels in a different horizontal plane and vertical side panels interconnecting said certain and said other panels, all the side panels being provided with means for inserting lift forks therethrough and all but the outermost side panels being provided with means for slidably receiving supporting means and supporting means aligned transversely of said side panels and slidably positioned through said side panels, said supporting means being adapted to cooperate with said side panels whereby said certain panels and said other panels are supported in spaced apart relation thereby to permit insertion of lift forks through said means for inserting lift forks through said side panels for lifting the pallet and the load thereon, a certain panel being provided at each of the other two opposed edges of said sheet and of such width as to lap over a portion of the next adjacent certain panel and adapted for fastening thereto whereby the ends of the supporting means are covered by said outermost side panels and said certain panels at each end of said sheet thereby preventing said supporting means from sliding from its position within the side panels.

Another feature of the present invention is the provision of a knock-down pallet of the aforementioned feature wherein the means for inserting lift forks through said side panels includes perforations outlining openings therein and the openings are made only when lift forks punch out the sheet material outlined by said perforation thereby providing additional support strength to the pallet while the pallet is being loaded.

Another feature of the present invention is the provision of a knock-down pallet of the first mentioned feature wherein said means for slidably receiving supporting means in all but the outermost panels includes a plurality of aligned slots substantially entirely, transversely thereof and said supporting means includes a plurality of rib members slidably inserted in the slots in said side panels and with the edges thereof abutting the inner surfaces of said certain and said other panels.

Still another feature of the present invention is the provision of a knock-down pallet of the first mentioned feature wherein said means for slidably receiving supporting means in all but the outermost side panels includes spaced openings through the respective side panels, said openings being vertical, regular isosceles trapezoids and said supporting means includes support members cut partially therethrough with two grooves the length thereof, said support members being folded along the grooves to form an inverted channel member slidably mounted within the openings in said side panels thereby providing vertical and horizontal stability to the pallet.

Still another feature of the present invention is the provision of a knock-down pallet of the first mentioned feature wherein said means for slidably receiving supporting means in all but the outermost side panels includes spaced openings through the respective side panels, said openings being vertical, regular isosceles trapezoids and said supporting means includes support members with aligned spaced outwardly projecting portions on two opposed edges thereof, said projecting portions being provided with a groove on the inner margin thereof and the width of said projecting portions being substantially the length of the sides of the isosceles trapezoidal openings, said support members being folded along the grooves to form inverted channel members slidably mounted within the openings in said side panels and with the adjacent edges of adjoining projecting portions positioned between adjacent side panels thereby providing vertical and horizontal stability to the pallet and a pallet which can be lifted by lift forks inserted from any side of the pallet.

Other features and advantages of this invention will become apparent from the specification, taken in connection with the accompanying drawings wherein.

Figure 1:
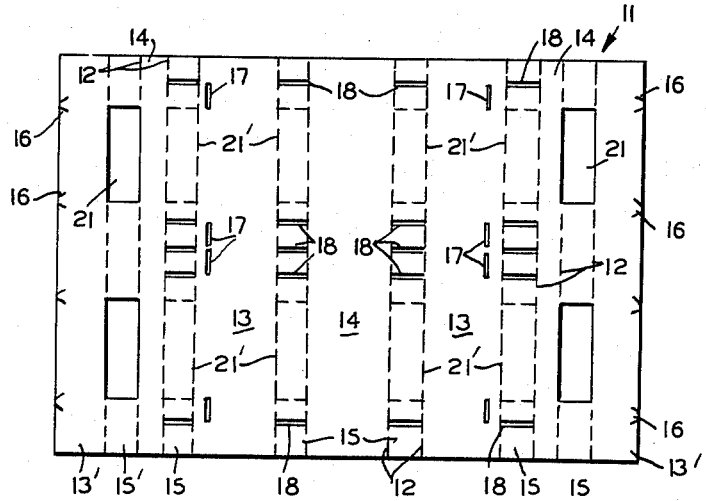
Fig. 1 is a plan view of a blank sheet scored and slotted in accordance with this invention.
Figure 3:
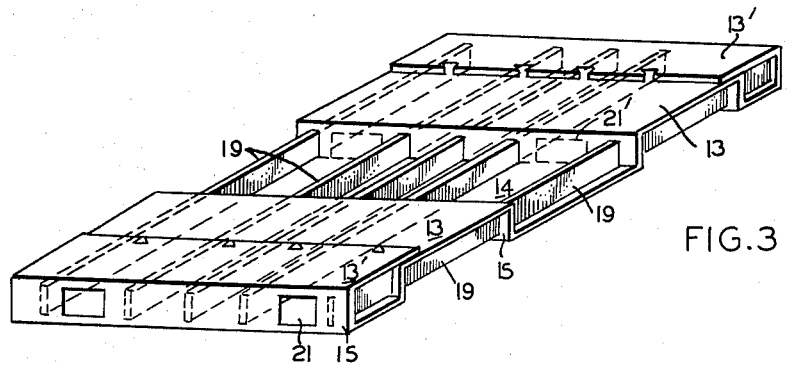
Fig. 3 is an enlarged perspective view of an assembled pallet comprising one embodiment of the present invention.
Figure 2:
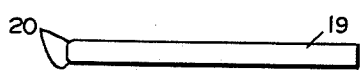
Fig. 2 is a plan view of a rib member.

Referring now to Figs. 1-3, a rectangular blank sheet 11 of corrugated paper or the like is scored along a plurality of parallel lines 12 transversely thereof in order that the sheet 11 can be easily folded to provide certain top load bearing panels 13 in substantially one horizontal plane, other bottom panels 14 in a different horizontal plane, and vertical side panels 15 interconnecting the top panels 13 and the bottom panels 14. A horizontal top load bearing panel 13' is provided at each of the two opposing ends of sheet 11, folds back above the adjacent bottom panel 14 and laps over a portion of the adjacent top panel 13. A number of pairs of diverging slits are cut into each of the two ends of sheet 11, each pair of slits providing a tab 16 which, in conjunction with slots 17 cut in the lapped portion of the top panel 13, provide means for joining the top panels 13 and 13'. These panels could be joined by other suitable means such as gluing, stapling or other tab and slot means. Three top and three bottom panels are shown in the drawing, but it is within the scope of this invention to utilize a lesser or greater number of channels.

All of the side panels 15 except the two outermost end side panels 15' are provided with a plurality of aligned slots 18 substantially entirely, transversely thereof, each row of slots across the length of sheet 11 being adapted to receive a supporting rib member 19 of a sturdy material as of, for example, kraft veneer board or the like. These ribs could also be of corrugated paper, but a pallet constructed with such ribs would not be able to support as heavy a load. The corners 20 on one end of the rib member 19 are preferably chamfered so that the rib member 19 can be more easily inserted in the slots 18. The side panels 15 and the rib members 19 keep one another vertically erect and evenly transmit the weight of the load vertically downward from the top panels. Each of the outermost side panels 15' is provided with two rectangular openings 21 adapted to receive the lift forks of a lift truck and the other side panels 15 are provided with two sets of rectangular perforations 21' for poking out an opening the size of openings 21 to receive the lift forks of a lift truck. The perforations 21' in each side panel 15 are aligned so that the lift forks can extend all the way under the load. By only perforating the side panels 15 extra support strength is provided for the pallet during loading when the load might be dropped on the pallet, and then the operator of the lift truck can insert his lift forks into openings 21 and knock out the perforated portions when it first picks up the pallet. All of the side panels 15 can be provided with openings 21 instead of just perforations if so desired.

The pallet is assembled by first folding the sheet 11 along the scored lines 12 to form the top panels 13, the bottom panels 14, and the side panels 15. Then the rib members 19 are inserted into the slots 18. The outermost side panels 15' are folded up to cover the ends of the rib members 19, and then the top panels 13' are partially lapped back over the top panels 13 and fastened thereto by means of the tabs 16. In this manner the rib members 19 are confined in position in the slots 18. Although not shown it is within the scope of the present invention to have the lapping and fastening portion underneath the pallet instead of on the top panels 13 and 13' as long as the outermost side panels 15' retain the rib members 19 in place. The illustrated embodiment is preferred since, once the pallet is loaded, the load will hold the tabs 16 in place.

Figure 4:
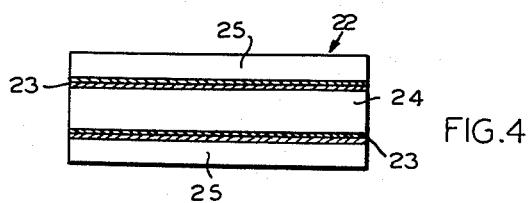
Fig. 4 is a plan view of the grooved support member.
Figure 5:
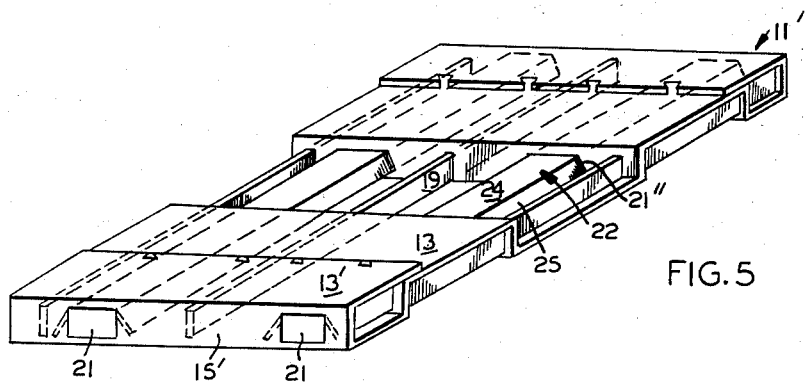
Fig. 5 is a perspective view of an assembled pallet comprising another embodiment of the present invention.

As a further embodiment of the present invention (see Figures 4 and 5) inverted channel support members 22 as of, for example, Kraft veneer board replace a number of the rib members 19 and extend the length of the pallet through openings 21" adding both vertical and horizontal stability to the pallet. The channel members 22 are formed by routing lengthwise thereof and partially therethrough two grooves 23 V shaped in cross section thereby providing a central portion 24 and two side projecting portions 25 to the channel member 22. The projecting portions 25 can then be bent down toward that surface into which the grooves 23 were routed. The central portion 24 and the projecting portions 25 of the channel members 22 form the top and sides, respectively, of a regular isosceles trapezoid. The openings 21" in all the side panels 15 other than the outermost side panels 15' are cut in the shape of isosceles trapezoids rather than the rectangles as shown in Fig. 1 in order to receive the channel members 22. The perforations 21 in the outermost side panels 15' are again rectangular providing a rectangular opening to permit insertion of lift forks but to cover the end of the channel members 22 thereby retaining the channel members 22 in position in the openings 21" in the side panels 15.

In a pallet constructed with the channel members 22 any sidewise horizontal force on the load on the pallet will tend to tip one of the projecting portions 25 of the channel member 22, but in order to do this the other projecting portion 25 will first have to be moved to a vertical position during which movement it will be opposed by the weight of the load. In this manner an extremely sturdy pallet is provided. A pallet of this latter construction made with 200 pound test heavy duty corrugated paper has supported a load in excess of five tons.

Figure 6:
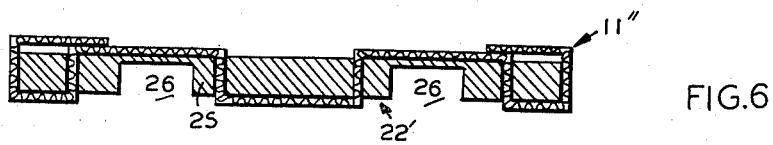
Fig. 6 is a side view of still another embodiment of the present invention.
Figure 7:
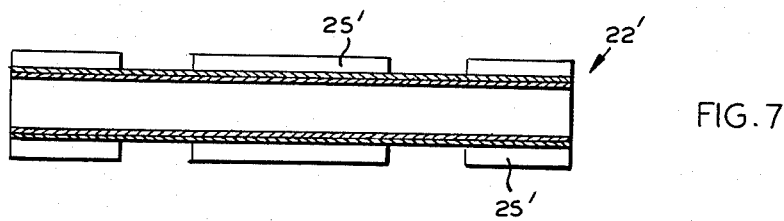
Fig. 7 is a plan view of the grooved support member used in the embodiment of the present invention illustrated in Fig. 6.

As still a further embodiment of the present invention (see Figures 6 and 7) a channel member 22' is routed in a manner similar to the channel member 22 described in detail above, and also the opposing projecting portions 25' are each cut away in matching areas whereby open slots 26 are provided transversely of the channel members 22' when the channel member 22' is slidably fitted within the sheet. By this construction a sheet 11" into which only channel members 22' are slidably fitted forms a pallet which can be lifted by a fork lift from all four sides instead of only two sides.

Figure 8:
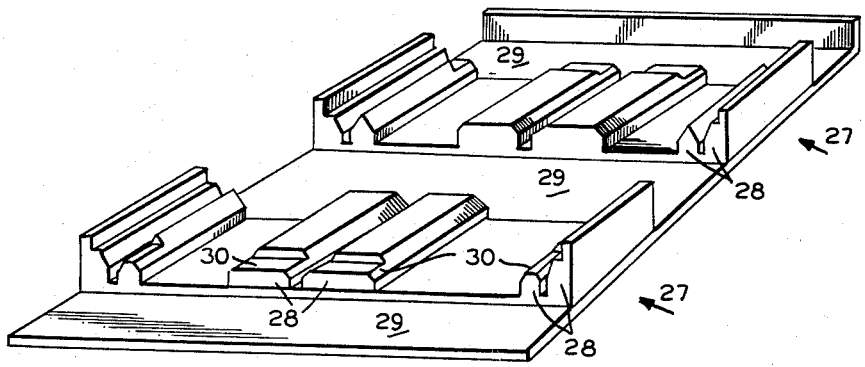
Fig. 8 is a perspective view of a jig used in assembling the novel pallets illustrated herein.

Fig. 8 shows a jig for assembling the different embodiments of the pallet of the present invention. The sheet 11 is placed on the jig between two retaining side members with each top panel 13 supported on the top of two identical oppositely oriented bracing platforms 27, each made up of rows of supporting ridges 28, with the sheet folded so that the bottom panels 14 lie on flat surfaces 29 on either side of the bracing platforms 27. The rib members 19 and/or the channel members 22 are then guided into the appropriate slots or openings by the supporting ridges 28. The outermost side panels 15' are folded over the ends of the rib members 19 and/or the channel members 22 and the top panels 13' are then lapped over and fastened to the top panels 13 by the tabs 16 which can be pressed through the top panels 13 due to recesses 30 on the ends of the supporting ridges 28.

Since many changes and modifications can be made without departing from the spirit of the invention this description is to be taken as purely illustrative and not in a limiting sense.

I claim:

1. A pallet adapted for use in lift truck operations and for flat shipment in knock-down position comprising a sheet of corrugated paper or the like having a multiplicity of spaced parallel scores extending between a pair of opposed edges and defining the side margins of a plurality of panels, said sheet folded on the scores to position certain panels in substantially one horizontal plane, other panels in a different horizontal plane and vertical side panels interconnecting said certain and said other panels, all the side panels being provided with means for inserting lift forks therethrough and all but the outermost side panels being provided with means for slidably receiving supporting means and supporting means aligned transversely of said side panels and slidably positioned through said side panels, said supporting means being adapted to cooperate with said side panels whereby said certain panels and said other panels are supported in spaced apart relation thereby to permit insertion of lift forks through said means for inserting lift forks through said side panels for lifting the pallet and the load thereon, a certain panel being provided at each of the other two opposed edges of said sheet and of such width as to lap over a portion of the next adjacent certain panel and adapted for fastening thereto whereby the ends of the supporting means are covered by said outermost side panels and said certain panels at each end of said sheet thereby preventing said supporting means from sliding from its position within the side panels.

2. The pallet of claim 1 wherein the means for inserting lift forks through said side panels includes perforations outlining openings therein and the openings are made only when lift forks punch out the sheet material outlined by said perforation thereby providing additional support strength to the pallet while the pallet is being loaded.

3. The pallet of claim 1 wherein said means for slidably receiving supporting means in all but the outermost side panels includes a plurality of aligned slots substantially entirely, transversely thereof and said supporting means includes a plurality of rib members slidably inserted in the slots in said side panels and with the edges thereof abutting the inner surfaces of said certain and said other panels.

4. The pallet of claim 1 wherein said means for slidably receiving supporting means in all but the outermost side panels includes spaced openings through the respective side panels, said openings being vertical, regular isosceles trapezoids and said supporting means includes support members cut partially therethrough with two grooves the length thereof, said support members being folded along the grooves to form an inverted channel member slidably mounted within the openings in said side panels thereby providing vertical and horizontal stability to the pallet.

5. The pallet of claim 1 wherein said means for slidably receiving supporting means in all but the outermost panels includes a plurality of aligned slots substantially entirely, transversely thereof and spaced openings through the respective side panels, said openings being vertical, regular isosceles trapezoids and said supporting means includes a plurality of rib members slidably inserted in the slots in said side panels and support members cut partially therethrough with two grooves the length thereof, said support members being folded along the grooves to form an inverted channel member slidable mounted within the openings in said side panels thereby providing vertical and horizontal stability to the pallet.

6. The pallet of claim 1 wherein said means for slidably receiving supporting means in all but the outermost side panels includes spaced openings through the respective side panels, said openings being vertical, regular isosceles trapezoids and said supporting means includes support members with aligned spaced outwardly projecting portions on two opposed edges thereof, said projecting portions being provided with a groove on the inner margin thereof and the width of said projecting portions being substantially the length of the sides of the isosceles trapezoidal openings, said support members being folded along the grooves to form inverted channel members slidably mounted within the openings in said side panels and with the adjacent edges of adjoining projecting portions positioned between adjacent side panels thereby providing vertical and horizontal stability to the pallet and a pallet which can be lifted by lift forks inserted from any side of the pallet.

7. A pallet adapted for use in lift truck operations and for flat shipment in knocked-down position comprising a sheet of corrugated paper or the like having a multiplicity of spaced parallel scores extending between a pair of opposed edges and defining the side margins of a plurality of panels, said sheet folded on the scores to position certain panels in substantially one horizontal plane, other panels in a different horizontal plane and vertical side panels interconnecting said certain and said other panels, said side panels having a plurality of aligned slots substantially entirely, transversely thereof and having means for inserting lift forks therethrough and a plurality of rib members slidably inserted in the slots in said side panels and with the edges thereof abutting the inner surfaces of said certain and said other panels whereby said side panels and said ribs support said certain panels and said other panels in spaced apart relation thereby to support a load and to permit insertion of lift forks through the means in said side panels for lifting the pallet and the load thereon.

8. The pallet of claim 7 including end side panels of said sheet, said end side panels provided only with means for inserting lift forks therethrough whereby said end side panels cover the ends of said rib members thereby preventing said ribs from sliding from their positions within the slots in said side panels.

9. The pallet of claim 7 wherein a certain panel is provided at each of the other two opposed edges of said sheet and of such width as to lap over a portion of said next adjacent certain panel and adapted for fastening thereto.

10. The pallet of claim 7 wherein said means for inserting lift forks through said side panels includes perforations outling openings therein and the openings are made only when lift forks punch out the sheet material outlined by said perforations thereby providing additional support strength to the pallet while the pallet is being loaded.

11. The pallet of claim 7 wherein the means for inserting lift forks through said side panels includes spaced openings through the respective side panels, said openings being vertical, regular isosceles trapezoids and including support members cut partially therethrough with two grooves the length thereof, said support members being folded along the grooves to form an inverted channel member slidably inserted within the openings in said side panels thereby providing vertical and horizontal stability to the pallet.

12. The pallet of claim 7 wherein the means for inserting lift forks through said side panels includes spaced openings through the respective side panels, said openings being vertical, regular isosceles trapezoids and including support members cut partially therethrough with two grooves the length thereof, said support members being folded along the grooves to form an inverted channel member slidably inserted within the openings in said side panels thereby providing vertical and horizontal stability to the pallet and end side panels of said sheet, said end side panels provided only with rectangular openings therethrough to receive lift forks whereby said end side panels cover the ends of said rib members and said support members thereby preventing said rib members and said support members from sliding from their positions within the slots in said side panels.

13. A pallet adapted for use in lift truck operations and for flat shipment in knocked-down position comprising a sheet of corrugated paper or the like having a multiplicity of spaced parallel scores extending between a pair of opposed edegs and defining the side margins of a plurality of panels, said panels including top load bearing panels adapted to lie in substantially one horizontal plane when erected, bottom panels adapted to lie in a different horizontal plane when erected, and side panels interconnecting said top panels and said bottom panels and adapted to lie vertical when the pallet is assembled, all the side panels being provided with means for inserting lift forks therethrough and all but the outermost side panels being provided with means for slidably receiving supporting means and supporting means adapted to be aligned transversely of and slidably positioned through all but the outermost side panels, a top panel being provided at each of the other two opposed edges of said sheet and of such width as to lap over a portion of the next adjacent top panel and adapted to be attached thereto whereby when the pallet is assembled the outermost side panels and said top panels at each end of said sheet prevent said supporting means from sliding from its position within the side panels.

14. The pallet of claim 13 wherein the means for inserting lift forks through said side panels includes perforations outlining spaced openings therein.

15. The pallet of claim 13 wherein said means for slidably receiving supporting means in all but the outermost side panels includes a plurality of aligned slots substantially entirely, transversely thereof and said supporting means includes a plurality of rib members slidably insertable within the slots in said side panels.

16. The pallet of claim 13 wherein said means for slidably receiving supporting means in all but the outermost side panels includes spaced openings through the respective side panels, said openings being vertical, regular isosceles trapezoids when the pallet is assembled and said supporting mean includes support members cut partially therethrough with two grooves the length thereof whereby said support members can be folded to form an inverted channel member which can be slidably fitted within the openings in said side panels when the pallet is assembled.

17. The pallet of claim 13 wherein said means for slidably receiving supporting means in all but the outermost side panels includes spaced openings through the respective side panels, said openings being vertical, regular isosceles trapezoids when the pallet is assembled and said supporting mean includes support members with aligned spaced, outwardly projecting portions on two opposed edges thereof, said projecting portions being provided with a groove on the inner margin thereof and the width of said projecting portions being substantially the length of the sides of the isosceles trapezoidal openings, said support members adapted to provide inverted channel members when assembled, with the adjacent edges of adjoining projecting portions positioned between adjacent panels when said support members are slidably mounted within the openings in said side panels thereby providing a pallet which can be lifted by lift forks inserted from any side of the pallet.

18. A pallet adapted for use in lift truck operations and for flat shipment in knocked-down position comprising a sheet of corrugated paper having a multiplicity of spaced parallel scores extending between a pair of opposed edges and defining the side margins of a plurality of panels, said sheet folded on the scores to position a plurality of top panels in substantially one horizontal plane, a plurality of bottom panels in a different horizontal plane and a plurality of side panels interconnecting said top panels and said bottom panels, all of said side panels being provided with means for inserting lift forks therethrough and all but the outermost of side panels provided with a plurality of aligned slots substantially entirely, transversely thereof and a plurality of rib members provided with parallel top and bottom edges, each of said rib members slidably inserted through a slot in each of said side panels which is provided with slots and with the top and bottom edges of said rib members abutting inner surfaces of said top panels and said bottom panels to hold said top panels and said bottom panels in spaced apart relation, the outermost side panels abutting the ends of said rib members and a top panel being provided at each of the other two opposed edges of said sheet, of such width as to lap over a portion of the next adjacent top panel and adapted for fastening thereto whereby said rib members are prevented from sliding from their positions within said side panels.

19. A pallet adapted for use in lift truck operations and for flat shipment in knocked-down position comprising a sheet of corrugated paper having a multiplicity of spaced parallel scores extending between a pair of opposed edges and defining the side margins of a plurality of panels, said sheet folded on the scores to position a plurality of top panels in substantially one horizontal plane, a plurality of bottom panels in a different horizontal plane and a plurality of side panels interconnecting said top panels and said bottom panels, the outermost side panels provided with spaced rectangular openings for inserting the lift forks of a lift truck therein and all the remaining side panels provided with a plurality of aligned slots substantially entirely, transversely thereof and with spaced trapezoidal openings substantially entirely, transversely thereof aligned with the rectangular openings; a plurality of rib members provided with parallel top and bottom edges, each of said rib members slidably inserted through a slot in each of said side panels which is provided with slots and with the top and bottom edges of said rib members abutting inner surfaces of said top panels and said bottom panels to hold said top and said bottom panels in spaced apart relation; and support members cut partially therethrough with two grooves the length thereof, said support members being folded along the grooves to form an inverted channel member slidably mounted within the trapezoidal openings and adapted to receive the lift forks of a lift truck, the outermost side panels abutting the ends of said rib members and said support members and a top panel being provided at each of the other two opposed edges of said sheet, of such width as to lap over a portion of the next adjacent top panel and adapted for fastening thereto whereby said rib members and said support members are prevented from sliding from their positions within said side panels.

20. A pallet adapted for use in lift truck operations and for flat shipment in knocked-down position comprising a sheet of corrugated paper having a multiplicity of spaced parallel scores extending between a pair of opposed edges and defining the side margins of a plurality posed edges and defining the side margins of a plurality of panels, said sheet folded on the scores to position a plurality of top panels in substantially one horizontal plane, a plurality of bottom panels in a different horizontal plane and a plurality of side panels interconnecting said top panels and said bottom panels, the outermost side panels provided with spaced rectangular openings for inserting the lift forks of a lift truck therein and all the remaining side panels provided with spaced trapezoidal openings substantially entirely, transversely thereof aligned with the rectangular openings and support members with aligned spaced, outwardly projecting portions on two opposed edges thereof, said projecting portions being provided with a groove on the inner margin thereof and the width of said projecting portions being substantially the length of the sides of the trapezoidal openings, said support members being folded along the grooves to form inverted channel members slidably mounted within the trapezoidal openings with adjacent edges of adjoining projecting portions positioned between adjacent side panels whereby the lift forks of a lift truck can be inserted into any side of the pallet, the outermost side panels abutting the ends of said support members and a top panel being provided at each of the other two opposed edges of said sheet, of such width as to lap over a portion of the next adjacent top panel and adapted for fastening thereto whereby said support members are prevented from sliding from their positions within said side panels.

References Cited in the file of this patent

UNITED STATES PATENTS

| | | |
|---|---|---|
| 1,852,471 | Nelson | Apr. 5, 1932 |
| 2,808,978 | Wright | Oct. 8, 1957 |

FOREIGN PATENTS

| | | |
|---|---|---|
| 1,169,077 | France | Sept. 8, 1958 |